(12) United States Patent
Urai et al.

(10) Patent No.: US 12,034,379 B2
(45) Date of Patent: Jul. 9, 2024

(54) POWER CONVERSION SYSTEM

(71) Applicant: Hitachi, Ltd., Tokyo (JP)

(72) Inventors: Hajime Urai, Tokyo (JP); Hiroshi Kamizuma, Tokyo (JP); Kimihisa Furukawa, Tokyo (JP); Noriya Nakao, Tokyo (JP); Kinya Nakatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 17/796,847

(22) PCT Filed: Feb. 25, 2021

(86) PCT No.: PCT/JP2021/007046
§ 371 (c)(1),
(2) Date: Aug. 1, 2022

(87) PCT Pub. No.: WO2021/177130
PCT Pub. Date: Sep. 10, 2021

(65) Prior Publication Data
US 2023/0056704 A1 Feb. 23, 2023

(30) Foreign Application Priority Data
Mar. 6, 2020 (JP) .................. 2020-038483

(51) Int. Cl.
*H02H 9/04* (2006.01)
*H01C 7/12* (2006.01)
(Continued)

(52) U.S. Cl.
CPC .............. *H02M 7/537* (2013.01); *H01C 7/12* (2013.01); *H02H 9/041* (2013.01); *H02H 9/06* (2013.01); *H02M 7/12* (2013.01); *H02M 1/32* (2013.01)

(58) Field of Classification Search
CPC ............ H02M 1/32; H02H 9/041; H02H 9/06
See application file for complete search history.

(56) References Cited

U.S. PATENT DOCUMENTS

| 8,120,294 B2 * | 2/2012 | Ibori ....................... H02M 1/32 363/34 |
| 2010/0327837 A1 * | 12/2010 | Tsugawa ................ H02M 1/32 323/285 |

(Continued)

FOREIGN PATENT DOCUMENTS

| JP | 55-2345 A | 1/1980 |
| JP | 10-75580 A | 3/1998 |

(Continued)

OTHER PUBLICATIONS

International Search Report (PCT/ISA/210) issued in PCT Application No. PCT/JP2021/007046 dated May 11, 2021 with English translation (four (4) pages).

(Continued)

*Primary Examiner* — Gary A Nash
(74) *Attorney, Agent, or Firm* — Crowell & Moring LLP

(57) ABSTRACT

Provided is a power conversion system that can suppress a fault in a short-circuiting switch that bypasses a fault unit and enhance the reliability and redundancy of the system. The power conversion system is provided with a plurality of power converter units that are formed by using semiconductor switch elements and are connected in series, and comprises: switch elements that are provided to input terminals and/or output terminals of the power converter units and bypass the power converter units; and overvoltage suppressing elements which are connected in parallel with the switch elements and in which conducting states are changed by an application of a prescribed voltage.

6 Claims, 3 Drawing Sheets

(51) Int. Cl.
    *H02H 9/06*     (2006.01)
    *H02M 1/32*     (2007.01)
    *H02M 7/12*     (2006.01)
    *H02M 7/537*     (2006.01)

(56) References Cited

U.S. PATENT DOCUMENTS

| | | | | |
|---|---|---|---|---|
| 2011/0235221 | A1* | 9/2011 | Vogeli | H02M 1/32 |
| | | | | 361/18 |
| 2014/0203632 | A1* | 7/2014 | Kouno | H02M 7/49 |
| | | | | 307/9.1 |
| 2016/0204599 | A1* | 7/2016 | Strangfeld | H02H 3/205 |
| | | | | 361/91.2 |
| 2016/0329824 | A1* | 11/2016 | Sugahara | H02H 3/05 |
| 2017/0264186 | A1* | 9/2017 | Shimura | H02M 1/32 |
| 2018/0175616 | A1* | 6/2018 | Schneider | H01T 1/14 |
| 2019/0244732 | A1 | 8/2019 | Hoffmann | |

FOREIGN PATENT DOCUMENTS

| | | |
|---|---|---|
| JP | 2000-245168 A | 9/2000 |
| JP | 2017-77114 A | 4/2017 |
| JP | 2019-145456 A | 8/2019 |
| JP | 2019-527932 A | 10/2019 |
| JP | 2020-36307 A | 3/2020 |

OTHER PUBLICATIONS

Japanese-language Written Opinion (PCT/ISA/237) issued in PCT Application No. PCT/JP2021/007046 dated May 11, 2021 (three (3) pages).

Extended European Search Report issued in European Application No. 21764312.1 dated Mar. 21, 2024 (8 pages).

Abramovitz, A. et al., "Survey of Solid-State Fault Current Limiters", IEEE Transactions on Power Electronics, Institute of Electrical and Electronics Engineers, USA, Jun. 1, 2012, pp. 2770-2782, vol. 27, No. 6, XP011436317 (13 Pages).

\* cited by examiner

POWER CONVERSION SYSTEM

TECHNICAL FIELD

The present invention relates to a power conversion system.

BACKGROUND ART

Many power conversion devices that convert AC to DC, or DC to AC have been used in recent years. Such power conversion devices are also applied to the high voltage field. In that case, for example, a single phase power converter including a semiconductor switching element (Insulated-gate bipolar transistor: IGBT and the like) is used, and a plurality of such single phase power converters are connected in series. With such a configuration, a voltage above the withstand voltage of the switching element can be outputted. The configuration is expected to be applied to a DC power transmission system (HVDC), a reactive power compensation device (STATCOM), a motor drive inverter, and the like.

As an example of a power conversion system including a plurality of single phase power converter units connected in series, there is known the power conversion system in which a plurality of single phase inverter devices (hereinafter, referred to as cell inverter devices) are connected in series to form an inverter device group for one phase, thereby forming a three-phase inverter system by combining a plurality of such inverter device groups into, for example, three phases (see Patent Literature 1).

When one cell inverter device becomes abnormal, such a series multiplex converter system cannot supply normal power to the load, and may also affect the normal operation of other no-fault single phase power converters. There is known a configuration that is provided with an output disconnection switch inserted in the output line of the single phase power converter unit and a bypass switch in a bypass circuit that bypasses the output of each single phase power converter, including the disconnection switch, in order to continue an operation without stopping all cell inverter devices when a fault (abnormality) is caused in one cell inverter device (see Patent Literature 2).

CITATION LIST

Patent Literature

Patent Literature 1: Japanese Unexamined Patent Application Publication No. Hei 10 (1998)-75580
Patent Literature 2: Japanese Unexamined Patent Application Publication No. 2000-245168

SUMMARY OF INVENTION

Technical Problem

However, in such the conventional series converter system, a fault in the short-circuiting switch that bypasses the fault unit at the time of a failure in the power converter unit is not considered. When the short-circuiting switch fails, the fault unit cannot be invalidated, and the entire power conversion system is required to be stopped.

The present invention has been made in view of such circumstances, and an object of the present invention is to provide a power conversion system which can suppress a fault in a short-circuiting switch that bypasses a fault unit and enhance the reliability and redundancy of the system.

Solution to Problem

To solve the above problems, a power conversion system of the present invention that is provided with a plurality of power converter units connected in series includes short-circuiting switches that are provided to input sides and/or output sides of the power converter units and bypass the power converter units, and overvoltage suppressing elements that are connected in parallel with the short-circuiting switches and in which conducting states are changed by an application of a prescribed voltage.

Other aspects of the present invention will be described in an embodiment described later.

Advantageous Effects of Invention

According to the present invention, it is possible to suppress a fault in the short-circuiting switch that bypasses the fault unit and enhance the reliability and redundancy of the system.

DESCRIPTION OF EMBODIMENTS

Hereinbelow, an embodiment of the present invention will be described in detail with reference to the drawings.

Embodiment

Figure 1:
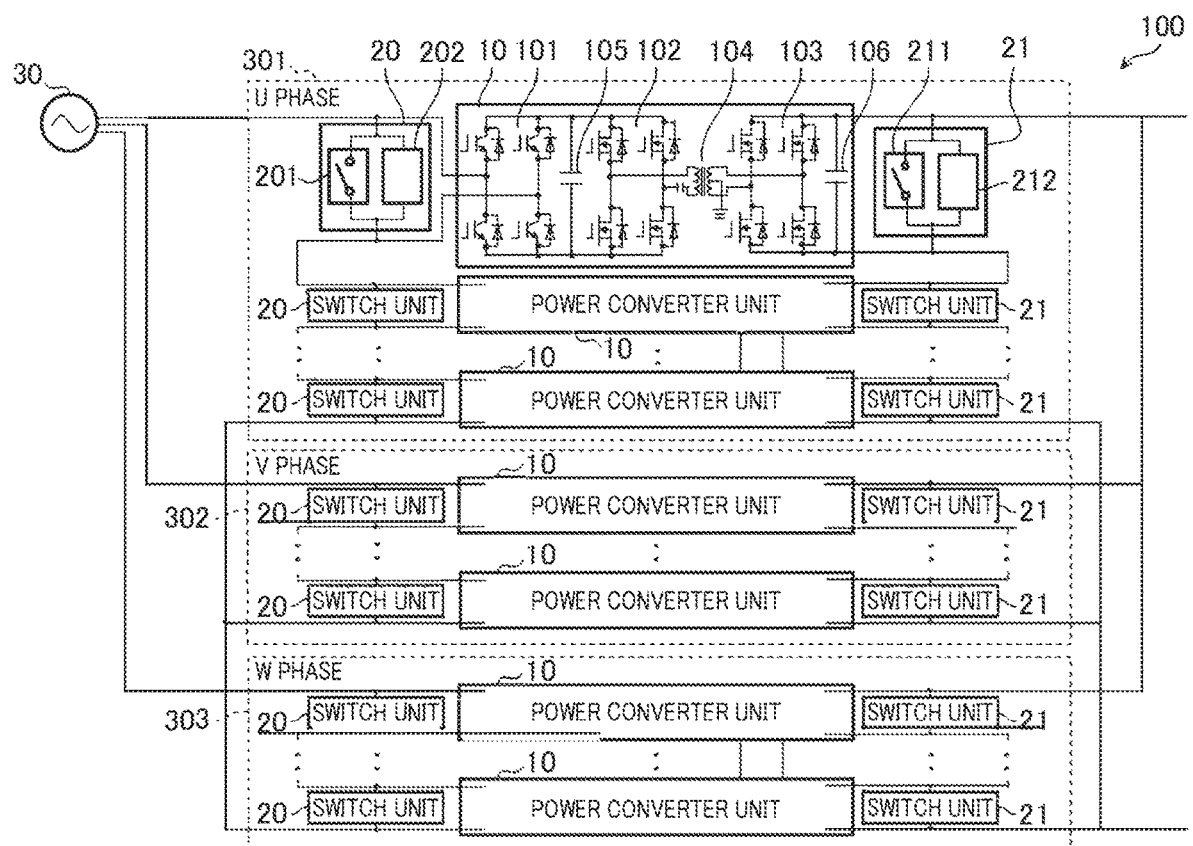
FIG. 1 is a diagram illustrating an overall configuration of a power conversion system according to an embodiment of the present invention.

FIG. 1 is a diagram illustrating an overall configuration of a power conversion system according to the embodiment of the present invention. This embodiment is an example in which the power conversion system is applied to multiplex power conversion devices using a plurality of high frequency AC link converters.

The Configuration of the Power Conversion System

A power conversion system 100 is provided with a plurality of single phase power converter units 10 (hereinafter, referred to as power converter units 10) that are formed by using semiconductor switch elements and are connected in series.

The power conversion system 100 is provided with a short-circuiting switch unit 20 on the input side provided to the input terminal (input side) of the power converter unit 10 and having a switch element 201 bypassing the power converter unit 10. Further, the power conversion system 100 is provided with a short-circuiting switch unit 21 on the output side provided to the output terminal (output side) of the power converter unit 10 and having a switch element 211 bypassing the power converter unit 10.

The plurality of power converter units 10 and the short-circuiting switch units 20 and 21 configure single phase power converter groups 301, 302, and 303. Three single phase power converter groups 301, 302, and 303 convert a three-phase (U, V, and W phases) AC power supply 30 to DC.

The respective power converter units 10 of the plurality of power converter units 10 have the same configuration. Also, the respective short-circuiting switch units 20 and 21 that are provided to the input terminal and the output terminal of the power converter unit 10 have the same configuration.

The Power Converter Unit 10

The power converter unit 10 will be described by taking the power converter unit 10 in the single phase power converter group 301 in FIG. 1 as an example. Here, the power converter unit 10 is a unit of the high frequency link converters.

The power converter unit 10 is provided with an AC/DC converter 101 that converts AC to DC, a high frequency DC/AC inverter 102 that converts DC to high frequency AC, a high frequency AC/DC converter 103 that converts high frequency AC to DC, an isolation transformer (high frequency transformer) 104, and smoothing capacitors 105 and 106.

The high frequency DC/AC inverter 102 and the high frequency AC/DC converter 103 are connected via the isolation transformer 104. As the high frequency AC, for example, a carrier frequency of the order of kHz is used.

The AC/DC converter 101, the high frequency DC/AC inverter 102, and the high frequency AC/DC converter 103 are a full bridge inverter or converter using IGBT (Insulated Gate Bipolar Transistor) as the semiconductor switch element. As the semiconductor switch element, for example, a power MOSFET (Power Metal-Oxide-Semiconductor Field-Effect Transistor) may be used.

In this embodiment, as an example of the power converter unit 10, the high frequency AC link converter is adopted as the example, but the power converter unit 10 may be of any type. Also, in FIG. 1, the converter or inverter alone or a combination of these may be changed.

Figure 2:
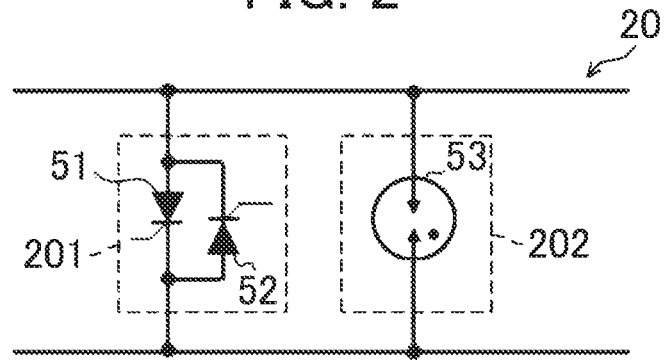
FIG. 2 is a diagram illustrating a configuration of a short-circuiting switch unit connected to the input terminal of a power converter unit of the power conversion system according to the embodiment of the present invention.

FIG. 2 is a diagram illustrating a configuration of the short-circuiting switch unit 20 connected to the input terminal (input side) of the power converter unit 10.

The short-circuiting switch unit 20 illustrated in FIG. 2 is provided with the switch element 201 (short-circuiting switch) and an overvoltage suppressing element 202 connected in parallel with the switch element 201. In the example in FIG. 1, the short-circuiting switch unit 20 is connected to the AC terminal of the three-phase AC power supply 30.

The Switch Element 201

The switch element 201 (short-circuiting switch) illustrated in FIG. 2 is the semiconductor switch element, and as the switch element 201, for example, thyristors 51 and 52 (short-circuiting switches) connected with reverse polarity are applied. The switch element 201 can be energized in both directions by connecting two thyristors 51 and 52 connected with reverse polarity.

The switch element 201 becomes conductive at the time of a fault on the input circuit side (AC/DC converter 101 side) in the power converter unit 10, and bypasses the power converter unit 10.

Note that as the switch element 201, the semiconductor switch element is desirably applied, but a mechanical contact type switch, such as an aerial relay and a vacuum switching device, can also be used.

The switch elements 201 and 211 (described later) can be configured of, for example, a mechanical type relay switch driven by an electromagnetic coil or a solid state switch, such as a thyristor and a MOSFET.

By applying the semiconductor switch element to the short-circuiting switch, the circuit can be short-circuited on the millisecond order, and in an element fault inside the single phase power converter unit, the fault current flowing through the element is bypassed for a short time to enable the breakdown fault in the element to be prevented. The fault spreading can be suppressed to a minimum, and the reliability can be further enhanced.

The Overvoltage Suppressing Element 202

The overvoltage suppressing element 202 illustrated in FIG. 2 is connected in parallel with the switch element 201, and the conducting state is changed according to voltage.

The overvoltage suppressing element 202 is a nonlinear resistance element that has low resistance when a high voltage is applied. As the nonlinear resistance element, for example, a gas arrester 53 using electric discharge and a varistor (described later) made of zinc oxide (ZnO) and the like and using a nonlinear resistor are applied. When a surge voltage that is instantaneously generated is applied, the gas arrester 53 passes only the surge voltage to the grounding side.

The gas arrester 53 of this embodiment is provided in the short-circuiting switch unit 20, and protects an internal fault in the power conversion system 100. That is, the gas arrester 53 has a use different from that of a gas arrester for protecting the power supply of an electronic device and a communication line from an induced lightning surge.

The switch element 201 has a withstand voltage in non-conducting state that is higher than the steady state operation voltage of the power converter unit 10 or the withstand voltage in non-conducting state of the semiconductor switch element configuring the power converter unit 10, and the overvoltage suppressing element 202 has an operation voltage that is between the withstand voltage of the switch element 201 and the withstand voltage of the semiconductor switch element configuring the power converter unit 10.

The switch element 201 has a withstand voltage in non-conducting state that is two times or more the steady state operation voltage of the power converter unit 10 or the withstand voltage in non-conducting state of the semiconductor switch element configuring the power converter unit 10.

Figure 3:
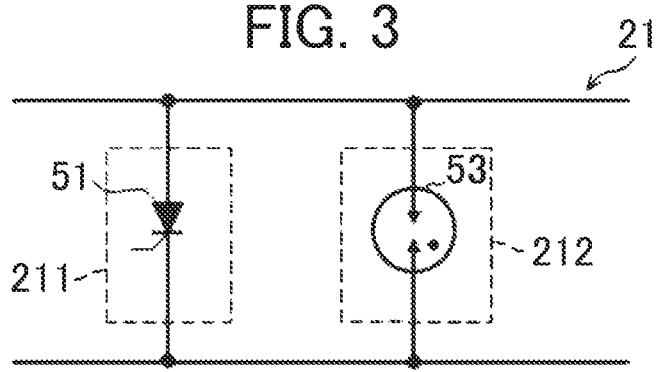
FIG. 3 is a diagram illustrating a configuration of a short-circuiting switch unit connected to the output terminal of the power converter unit of the power conversion system according to the embodiment of the present invention.

FIG. 3 is a diagram illustrating a configuration of the short-circuiting switch unit 21 connected to the output terminal (output side) of the power converter unit 10.

The short-circuiting switch unit 21 illustrated in FIG. 3 is provided with the switch element 211 (short-circuiting switch) and an overvoltage suppressing element 212 connected in parallel with the switch element 211. In the example in FIG. 1, the short-circuiting switch unit 21 is connected to the DC terminal.

The Switch Element 211

The switch element 211 (short-circuiting switch) illustrated in FIG. 3 is the semiconductor switch element, and as the switch element 211, for example, one thyristor 51 is applied. When applied to the DC terminal like the short-circuiting switch unit 21, the switch element 211 has unipolarity with one thyristor. However, as the switch element 211 of the short-circuiting switch unit 21, the switch element 201 in FIG. 2 may be used.

When the output circuit side (high frequency AC/DC converter 103 side) in the power converter unit 10 fails, the switch element 211 becomes conductive, and bypasses the power converter unit 10.

Note that as the switch element 211, the semiconductor switch element is desirably applied, but a mechanical contact type switch, such as an aerial relay and a vacuum switching device, can also be used.

The Overvoltage Suppressing Element 212

The overvoltage suppressing element 212 illustrated in FIG. 3 is connected in parallel with the switch element 211, and the conducting state is changed according to voltage.

The overvoltage suppressing element 212 is a nonlinear resistance element that has low resistance when a high voltage is applied, and as the overvoltage suppressing element 212, the gas arrester 53 (overvoltage suppressing element) using electric discharge and a varistor 54 (described later) (overvoltage suppressing element) made of zinc oxide (ZnO) and the like and using a nonlinear resistor are applied.

The switch element 211 has a withstand voltage in non-conducting state that is higher than the steady state operation voltage of the power converter unit 10 or the withstand voltage in non-conducting state of the semiconductor switch element configuring the power converter unit 10, and the overvoltage suppressing element 212 has an operation voltage that is between the withstand voltage of the switch element 211 and the withstand voltage of the semiconductor switch element configuring the power converter unit 10.

The switch element 211 has a withstand voltage in non-conducting state that is two times or more the steady state operation voltage of the power converter unit 10 or the withstand voltage in non-conducting state of the semiconductor switch element configuring the power converter unit 10.

The Short-Circuiting Switch Unit 20 and the Short-Circuiting Switch Unit 21

The short-circuiting switch unit 20 connected to the input terminal of the power converter unit 10 and the short-circuiting switch unit 21 connected to the output terminal of the power converter unit 10 may have the same configuration and specifications, or may have different configurations and specifications. Also, the switch element 201 of the short-circuiting switch unit 20 and the switch element 211 of the short-circuiting switch unit 21 are not required to have the same specifications. Likewise, the overvoltage suppressing element 202 of the short-circuiting switch unit 20 and the overvoltage suppressing element 212 of the short-circuiting switch unit 21 are not required to have the same specifications.

Another Configuration Example of the Short-Circuiting Switch Unit

Figure 4:
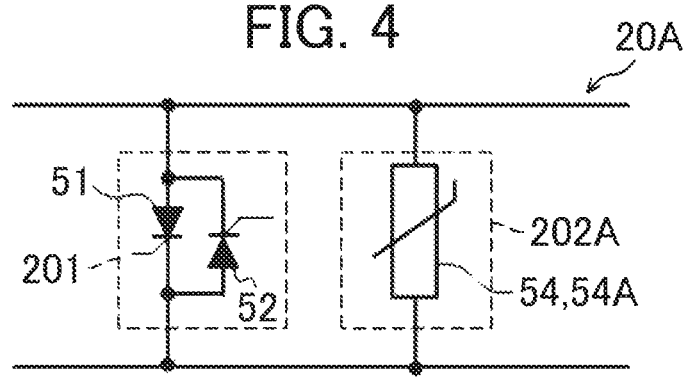
FIG. 4 is a diagram illustrating another configuration of a short-circuiting switch unit connected to the input terminal of the power converter unit of the power conversion system according to the embodiment of the present invention.

FIG. 4 is a diagram illustrating another configuration of a short-circuiting switch unit 20A connected to the input terminal (input side) of the power converter unit 10.

The short-circuiting switch unit 20A illustrated in FIG. 4 is provided with the switch element 201 and an overvoltage suppressing element 202A connected in parallel with the switch element 201.

The overvoltage suppressing element 202A is a nonlinear resistance element that has low resistance when a high voltage is applied, and as the overvoltage suppressing element 202A, for example, the varistor 54 made of zinc oxide (ZnO) and the like and using a nonlinear resistor is applied. Alternatively, as the overvoltage suppressing element 202A, a metal oxide varistor (MOV: Metal Oxide Varistor) 54A (overvoltage suppressing element) that has short operation time is applied. When the abrupt surge voltage of an outside lightning impulse is required to be protected, the MOV 54A having short operation time is desirably installed.

Figure 5:
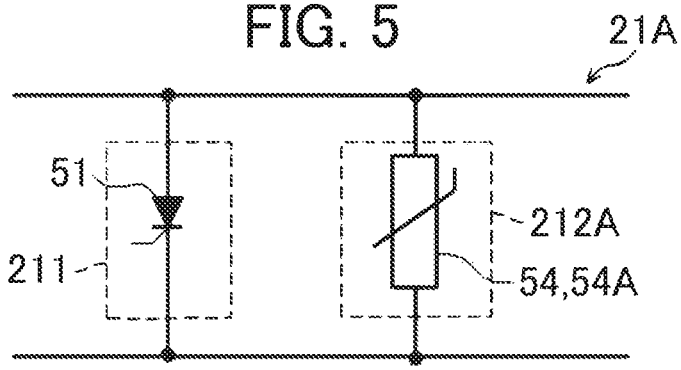
FIG. 5 is a diagram illustrating another configuration of a short-circuiting switch unit connected to the output terminal of the power converter unit of the power conversion system according to the embodiment of the present invention.

FIG. 5 is a diagram illustrating another configuration of a short-circuiting switch unit connected to the output terminal (output side) of the power converter unit 10.

A short-circuiting switch unit 21A illustrated in FIG. 5 is provided with the switch element 211 and an overvoltage suppressing element 212A connected in parallel with the switch element 211.

The overvoltage suppressing element 212A is for example, the varistor 54 made of zinc oxide (ZnO) and the like and using a nonlinear resistor or the metal oxide varistor 54A that has short operation time.

As described above, as the overvoltage suppression elements 202, 212, 202A, and 212A connected in parallel with the switch elements 201 and 211, the gas arrester 53 using electric discharge, the varistor 54 using a nonlinear resistor, and the metal oxide varistor 54A are applied.

The overvoltage suppressing elements 202, 212, 202A, and 212A are only required to be nonlinear resistance elements that have low resistance when a high voltage is applied, and are not limited to the varistor 54, the gas arrester 53, and the like. However, in the case of the internal breakdown of the switch element and the like configuring the inverter or converter, when after the short-circuiting fault moves to arc discharge, the arc is extinguished, a high frequency voltage having attenuation properties is generated. Thus, the overvoltage suppressing elements 202 and 212 are desirably the gas arrester 53 having a large withstand passing current $I^2t$ capacity.

Hereinbelow, the operation of the power conversion system 100 configured as described above will be described.

In the power conversion system 100, when the single phase power converter of one power converter unit 10 fails, the power converter unit 10 is disconnected from the system by the switch element 201 of the short-circuiting switch unit 20, and the output of the power converter unit 10 is bypassed by the switch element 211 of the short-circuiting switch unit 21. Thus, the single phase power converter related to the fault is removed from the system, and the operation can be continued as-is. As a result, by the series output of the remaining no-fault power converter units 10, the power supply to the load is continued to enhance the reliability of the power supply.

However, the switch elements 201 and 211 configuring the short-circuiting switch units 20 and 21 are considered to be broken due to an overcurrent by the surge voltage at the time of fault current cutoff. That is, as the switch elements 201 and 211, the semiconductor switch elements, such as the thyristors 51 and 52, are used from the requirement for the small and lightweight and the fast short-circuiting operation. The semiconductor switch element is operated by the prescribed operation voltage, and is not used in an environment exceeding the withstand voltage.

The present inventors have also considered the breakdown of the switch elements 201 and 211 from the viewpoint of the operation continuity of the power conversion system. The present inventors have found that in the case where the switch element or the like configuring the inverter or converter of the power converter unit 10 is broken, when after the short-circuiting fault moves to arc discharge, the arc is extinguished, a high frequency voltage having attenuation properties is generated. Such the high frequency voltage may break the switch elements 201 and 211 of the short-circuiting switch units 20 and 21. If the switch elements 201 and 211 are broken due to an overcurrent by the surge voltage at the time of fault current cutoff, the disconnection of the power converter unit related to the fault from the system by the switch element 201 and the output bypass function of the power converter unit 10 related to the fault by the switch element 211 are hindered.

Accordingly, the power conversion system 100 is provided with the overvoltage suppressing elements 202 and 212 that are connected in parallel with the switch elements 201 and 211 of the short-circuiting switch units 20 and 21 and in which conducting states are changed according to the voltage applied to the switch elements 201 and 211. For example, the switch element 201 is the thyristors 51 and 52 (see FIG. 2), and the switch element 211 is the thyristor 51 (see FIG. 3). Also, the overvoltage suppressing elements 202 and 212 are the gas arrester 53 (see FIGS. 2 and 3).

The withstand voltage of the switch elements 201 and 211 are two times or more the operation voltage, and the operation voltage (voltage in which the conducting state is changed) of the gas arrester 53 (overvoltage suppressing element) is made to be the operation voltage one to two times the operation voltage of the switch elements 201 and 211. Also, in consideration that when after the short-circuiting fault moves to arc discharge, the arc is extinguished, a high frequency voltage having attenuation properties is generated, the gas arrester 53 is desirably the gas arrester 53 having the large withstand passing current $I^2t$ capacity.

As described above, the power conversion system 100 (see FIG. 1) of this embodiment is provided with a plurality of power converter units 10 (see FIG. 1) that are foamed by using the semiconductor switch elements and are connected in series, and includes the switch elements 201 and 211 (short-circuiting switches) that are provided to the input terminals and/or the output terminals of the power converter units 10 and bypass the power converter units 10 (see FIG. 1), and the overvoltage suppressing elements 202 and 212 that are connected in parallel with the switch elements 201 and 211 and in which conducting states are changed by an application of a prescribed voltage.

With this configuration, when one power converter fails, the power converter unit 10 is bypassed by the switch elements 201 and 211, so that the operation of the power conversion system 100 can be continued.

At the time of a fault in the power converter, an overvoltage may be transiently generated. The overvoltage suppressing elements 202 and 212 in which conducting states are changed by an application of a prescribed voltage can prevent a voltage above the withstand voltage from being applied to the switch elements 201 and 211, and enhance the reliability of the switch elements 201 and 211.

Also, since the conducting states are changed by an application of a prescribed voltage, the overvoltage suppressing elements 202 and 212 are not required to introduce new control means, so that the cost can be lowered.

In this way, in the power conversion system 100 including the plurality of power converter units 10 connected in series, even when some power converter units 10 fail, the fault power converter units can be bypassed by the switch elements 201 and 211 (short-circuiting switches), and the power supply to the load can be continued. Also, when an overvoltage is generated at the time of a fault in the power converter unit, a fault in the short-circuiting switch can be reliably prevented to enhance the reliability and redundancy of the system.

Here, the maximum value Vc of the operation voltage of the power converter unit 10, the withstand voltage Vs of the switch elements 201 and 211 (short-circuiting switches), and the operation voltage Va of the overvoltage suppressing elements satisfy the relationship of the following equation (1).

$$Vc<Va<Vs \qquad (1)$$

By satisfying the relationship of the above equation (1), a dielectric breakdown fault in the short-circuiting switch can be reliably prevented in the state where the short-circuiting switch is in non-conducting state. As a result, the reliability can be further enhanced.

Further, when the semiconductor switch element of the power converter unit 10 short-circuiting fails, a high frequency current may be flowed by the smoothing capacitors 105 and 106 (see FIG. 1) and the reactance component of the circuit (see the high frequency transformer 104 in FIG. 1). For example, when arcing occurs in the fault element and the arc is instantaneously extinguished, a high frequency transient voltage two times the voltage of the smoothing capacitors 105 and 106 is generated. The withstand voltage Vs of the short-circuiting switch is made to be two times the maximum value Vc of the operation voltage, so that even when there is an operation delay or no-operation fault in the overvoltage suppressing elements 202 and 212 (see FIG. 1), the fault due to the dielectric breakdown of the short-circuiting switch can be prevented, so that the system having high reliability can be configured.

Modification Examples

Figure 6:
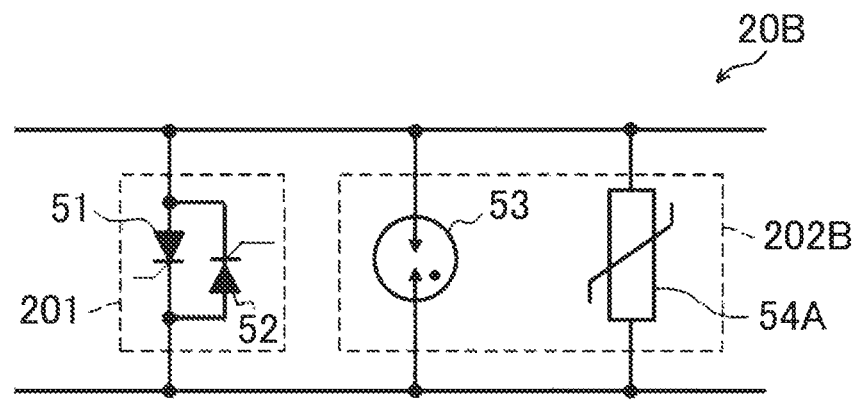
FIG. 6 is a diagram illustrating a further configuration of a short-circuiting switch unit connected to the input terminal of the power converter unit of the power conversion system according to the embodiment of the present invention.

FIG. 6 is a diagram illustrating a further configuration of a short-circuiting switch unit connected to the input terminal of the power converter unit 10.

A short-circuiting switch unit 20B illustrated in FIG. 6 is provided with the switch element 201 (short-circuiting switch) and an overvoltage suppressing element 202B connected in parallel with the switch element 201.

The overvoltage suppressing element 202B is provided with the gas arrester 53 (a first overvoltage suppressing element) and the MOV 54A (a second overvoltage suppressing element), which are connected in parallel. The overvoltage suppressing element 202B has the gas arrester 53 using electric discharge and the MOV 54A having short operation time, which are connected in parallel. That is, the short-circuiting switch unit 20B has the gas arrester 53 and the MOV 54A having different characteristics, which are connected in parallel.

Figure 7:
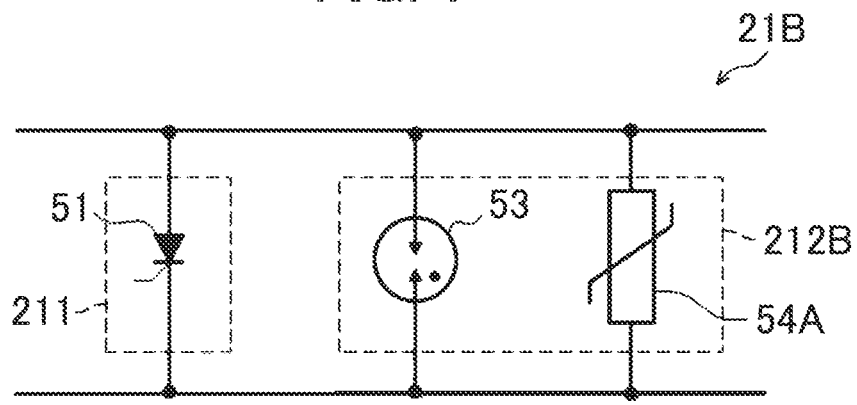
FIG. 7 is a diagram illustrating a further configuration of a short-circuiting switch unit connected to the output terminal of the power converter unit of the power conversion system according to the embodiment of the present invention.

FIG. 7 is a diagram illustrating a further configuration of a short-circuiting switch unit connected to the output terminal of the power converter unit 10.

A short-circuiting switch unit 21B illustrated in FIG. 7 is provided with the switch element 211 (short-circuiting switch) and an overvoltage suppressing element 212B connected in parallel with the switch element 211.

The overvoltage suppressing element 212B is provided with the gas arrester 53 (the first overvoltage suppressing element) and the MOV 54A (the second overvoltage suppressing element), which are connected in parallel. The overvoltage suppressing element 212B has the gas arrester 53 using electric discharge and the MOV 54A having short operation time, which are connected in parallel.

In this way, in the short-circuiting switch units 20B and 21B, the gas arrester 53 and the MOV 54A having different operation time in which the conducting state is changed are connected in parallel with the switch elements 201 and 211, so that a fault in the switch elements 201 and 211 due to the surge voltage at the time of fault current cutoff can be immediately and reliably suppressed. That is, first, the surge voltage application to the switch elements 201 and 211 is immediately suppressed by the MOV 54A having short operation time (responsibility securement), and then, the fault due to the overcurrent is suppressed by the gas arrester 53 having the large withstand passing current $I^2t$ capacity (suppressing effect securement).

With this, also when an overvoltage is generated at the time of a fault in the power converter unit 10, a fault in the short-circuiting switch can be prevented more reliably, so that the reliability and redundancy of the system can be further enhanced.

Note that in place of the MOV 54A, or additionally, the gas arrester 53 (see FIGS. 2 and 3) may be added in parallel with the switch elements 201 and 211.

The present invention is not limited to the above embodiment, and includes other modification examples and application examples as long as it does not depart from the purport of the present invention described in the claims.

For example, the short-circuiting switch may be provided to any one of the input terminal and the output terminal of the power converter unit. Also, part of the configuration of one embodiment can be replaced with the configurations of other embodiments, and the configuration of the one embodiment can also be added with the configurations of other embodiments. Also, part of the configuration of each embodiment can be subjected to addition, deletion, and replacement with respect to other configurations.

Also, the control lines and the information lines that are considered to be necessary for the description are represented, and all the control lines and information lines are not necessarily represented for the product. It may be considered that actually, almost all the configurations are mutually connected.

LIST OF REFERENCE SIGNS

10 Power converter unit
20, 20A, 20B Short-circuiting switch unit (input side)
21, 21A, 21B Short-circuiting switch unit (output side)
30 Three-phase AC power supply
51, 52 Thyristor (semiconductor switch element, short-circuiting switch)
53 Gas arrester (overvoltage suppressing element (first overvoltage suppressing element))
54 Varistor (overvoltage suppressing element)
54A Metal oxide varistor (overvoltage suppressing element (second overvoltage suppressing element))
100 Power conversion system
101 AC/DC converter
102 High frequency DC/AC inverter
103 High frequency AC/DC converter
104 Isolation transformer (high frequency transformer)
105, 106 Smoothing capacitor
201, 211 Switch element (short-circuiting switch)
202, 212 Overvoltage suppressing element
301, 302, 303 Single phase power converter group

The invention claimed is:

1. A power conversion system that is provided with a plurality of power converter units connected in series comprising:
    short-circuiting switches that are provided to input sides and/or output sides of the power converter units and bypass the power converter units; and
    overvoltage suppressing elements that are connected in parallel with the short-circuiting switches and in which conducting states are changed by an application of a prescribed voltage.

2. The power conversion system according to claim 1, wherein each of the short-circuiting switches is a semiconductor switch element.

3. The power conversion system according to claim 1, wherein each of the overvoltage suppressing elements is at least one or more of a gas arrester using gas electric discharge, a varistor using a nonlinear resistor, and a metal oxide varistor.

4. The power conversion system according to claim 1, wherein the overvoltage suppressing element is provided with a first overvoltage suppressing element in which a conducting state is changed for first operation time and a second overvoltage suppressing element in which a conducting state is changed for second operation time, and
    wherein the first overvoltage suppressing element and the second overvoltage suppressing element are connected in parallel with the short-circuiting switch.

5. The power conversion system according to claim 1, wherein the short-circuiting switch has a withstand voltage in non-conducting state that is higher than the steady state operation voltage of the power converter unit or the withstand voltage in non-conducting state of the semiconductor switch element configuring the power converter unit, and
    wherein the overvoltage suppressing element has an operation voltage that is between the withstand voltage of the short-circuiting switch and the withstand voltage of the semiconductor switch element configuring the power converter unit.

6. The power conversion system according to claim 1, wherein the short-circuiting switch has a withstand voltage in non-conducting state that is two times or more the steady state operation voltage of the power converter unit or the withstand voltage in non-conducting state of the semiconductor switch element configuring the power converter unit.

* * * * *